(12) United States Patent
Winn

(10) Patent No.: US 9,389,997 B2
(45) Date of Patent: Jul. 12, 2016

(54) HEAP MANAGEMENT USING DYNAMIC MEMORY ALLOCATION

(71) Applicant: International Business Machines Corporation, Armonk, NY (US)

(72) Inventor: Geoffrey M. Winn, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 13/869,505

(22) Filed: Apr. 24, 2013

(65) Prior Publication Data

US 2014/0325177 A1 Oct. 30, 2014

(51) Int. Cl.
*G06F 12/00* (2006.01)
*G06F 13/00* (2006.01)
*G06F 13/28* (2006.01)
*G06F 12/02* (2006.01)

(52) U.S. Cl.
CPC .................................... *G06F 12/023* (2013.01)

(58) Field of Classification Search
CPC ...................................................... G06F 12/023
USPC ................................................... 711/170, 173
See application file for complete search history.

(56) References Cited

U.S. PATENT DOCUMENTS

| 7,418,568 | B2 | 8/2008 | Maly |
| 7,587,566 | B2 | 9/2009 | Ballantyne et al. |
| 8,074,044 | B2 | 12/2011 | Sze et al. |
| 8,151,086 | B2 | 4/2012 | McDavitt et al. |
| 2002/0143521 | A1* | 10/2002 | Call ..................... G06F 17/2247 704/1 |
| 2004/0162861 | A1* | 8/2004 | Detlefs ............... G06F 12/0276 |
| 2009/0172337 | A1 | 7/2009 | Van Riel et al. |

OTHER PUBLICATIONS

Gabbrielli et al.; "Programming Languages: Principles and Paradigms"; Undergraduate Topics in Computer Science; Chapter 5 Memory Management; Published 2006 by McGraw-Hill Companies, Publishing Group Italia; Copyright Springer-Verlag London Limited 2010.

* cited by examiner

*Primary Examiner* — Charles Rones
*Assistant Examiner* — Sidney Li
(74) *Attorney, Agent, or Firm* — Trentice V. Bolar

(57) ABSTRACT

Embodiments of the present invention provide a method, system, and program product for heap management using dynamic memory allocation. The method comprises receiving, via a computing device, a memory request associated with a memory block, wherein the computing device has a double linked list of fixed sized memory blocks and a double linked list of variable sized memory blocks; and wherein each memory block includes a value field and a header field, which includes one or more of a backward link, forward link, and memory block size indicator that includes a first bit and a second bit. The method further comprises determining a scope of the received memory request, which can be a request for memory allocation or memory deallocation. Further still, the method comprises servicing the received memory request.

18 Claims, 8 Drawing Sheets

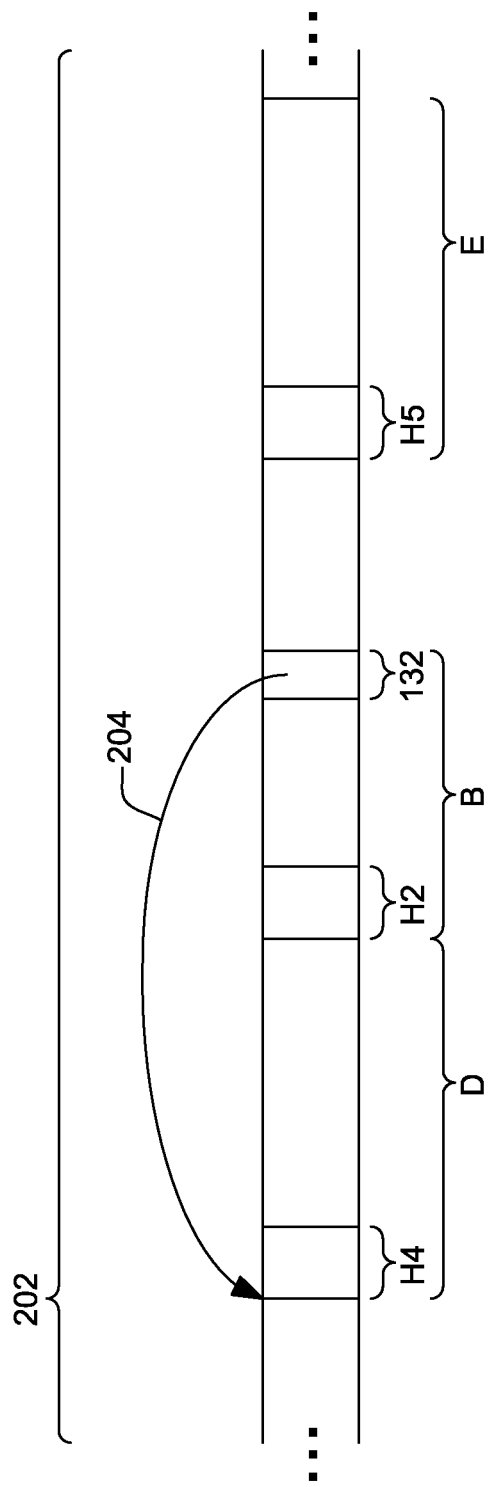

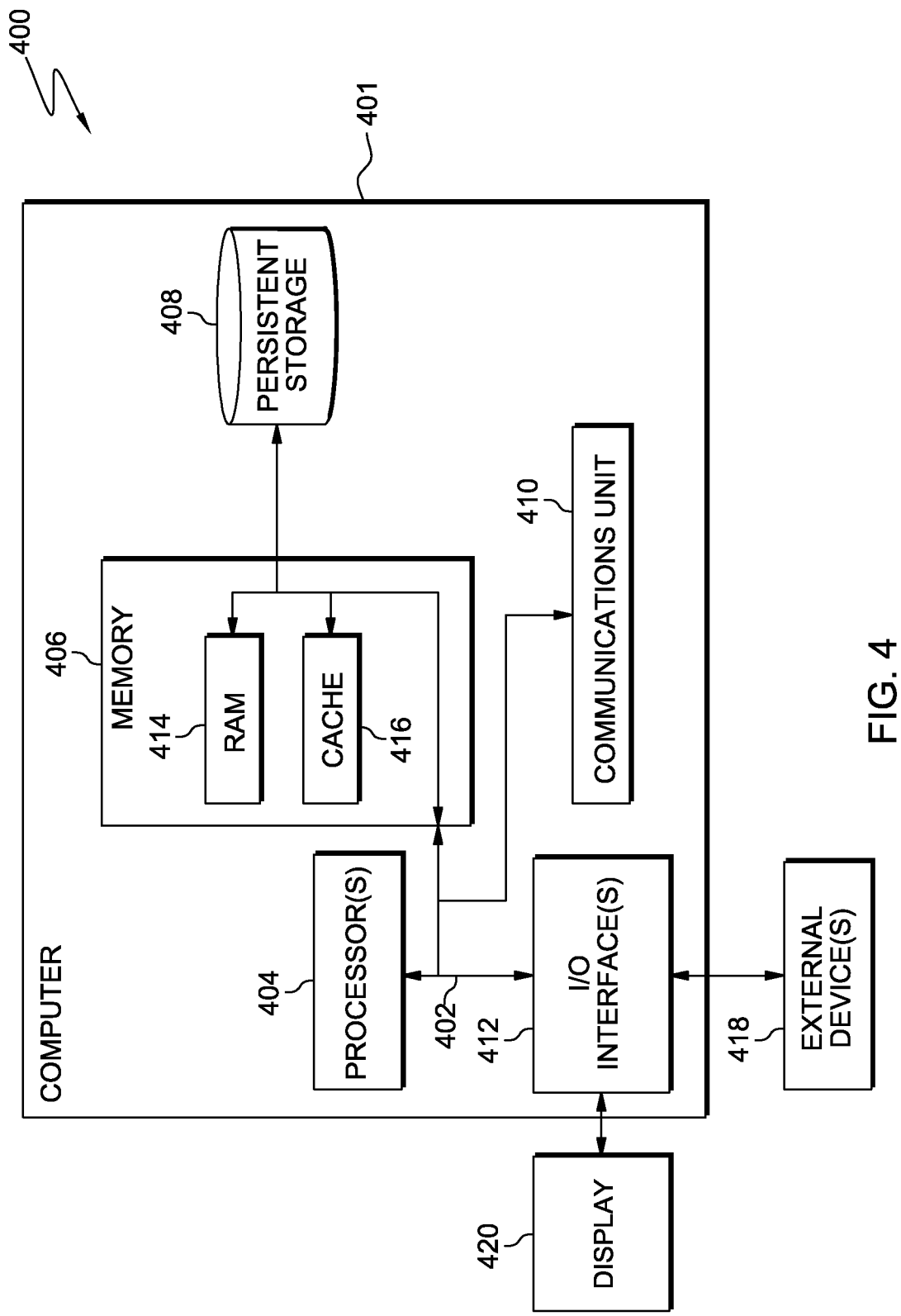

HEAP MANAGEMENT USING DYNAMIC MEMORY ALLOCATION

FIELD OF THE INVENTION

The present invention relates generally to the field of heap management, and more particularly to heap management using dynamic memory allocation.

BACKGROUND OF THE INVENTION

Memory management among processes is an important task supported by most modern operating systems. The task of memory management involves several aspects, one of which is memory allocation within a process. Memory requests are satisfied by allocating blocks of memory (hereinafter "blocks") from a large pool of memory called a heap. Although heap management, a form of memory allocation, is typically directed by a computer's operating system and accessed via standard interfaces, many programs may still need to manage dynamic memory allocation themselves, especially in shared memory, multi-process systems. Some solutions use a single large block and then fulfill requests for memory by dividing that block and returning the block requested to the requestor. When the requestor returns the block back, it is subsequently merged with a neighboring free block, if they are immediately adjacent, or inserted into a free list of currently free blocks. A free list is a data structure used in a scheme for dynamic memory allocation and operates by connecting unallocated regions of memory together in a linked list, using the first word of each unallocated region as a pointer to the next.

The time that it takes to find a suitably sized block to fulfill a request for memory, or to check for an adjacent block when a block is given back as free memory increases as free memory becomes fragmented into small discontinuous chunks.

Other solutions augment the single free list of variable sized blocks, with an additional set of free lists, where each list contains only blocks of the same fixed size. Populating the fixed size lists on demand requires that early requests for memory are served much as they would have been in the original case. However, as time goes on and the fixed size blocks are returned to their corresponding free list, more and more requests for memory will be served from the fixed size lists where allocation and deallocation can be completed with few pointer resets and no searching of linked lists.

Since the blocks on the fixed size list were originally requested by a process, it suggests that blocks of that size may be needed again in future by that particular process. However, if there is no requestor for blocks of a particular size, the fixed sized lists that include blocks of that size can have unused blocks that are not available for other processes.

SUMMARY

Embodiments of the present invention provide a method, system, and program product for heap management using dynamic memory allocation. The method comprises receiving, via a computing device, a memory request associated with a memory block, wherein the computing device has a double linked list of fixed sized memory blocks and a double linked list of variable sized memory blocks; and wherein each memory block included in the double linked list of fixed sized memory blocks and a double linked list of variable sized memory blocks includes a value field and a header field; wherein the header fields includes one or more of a backward link, forward link, and memory block size indicator; and wherein the memory block size indicator includes a first bit that reflects whether the value field includes a start address of another memory block that precedes the memory block in memory address and a second bit that reflects whether the memory block is in use by a process associated with the computing device. The method further comprises determining a scope of the received memory request, wherein the scope of the received memory request is a request for memory allocation or memory deallocation. Further still, the method comprises servicing, in response to the determining the scope of the received memory request, the received memory request.

BRIEF DESCRIPTION OF THE SEVERAL VIEWS OF THE DRAWINGS

FIG. 2C illustrates an exemplary block diagram of portions of the variable size list and fixed size list of FIGS. 2A and 2B, respectively, in accordance with an embodiment of the present invention.

FIG. 4 is a block diagram of a computer system, in accordance with an embodiment of the present invention.

DETAILED DESCRIPTION

Figure 1A:
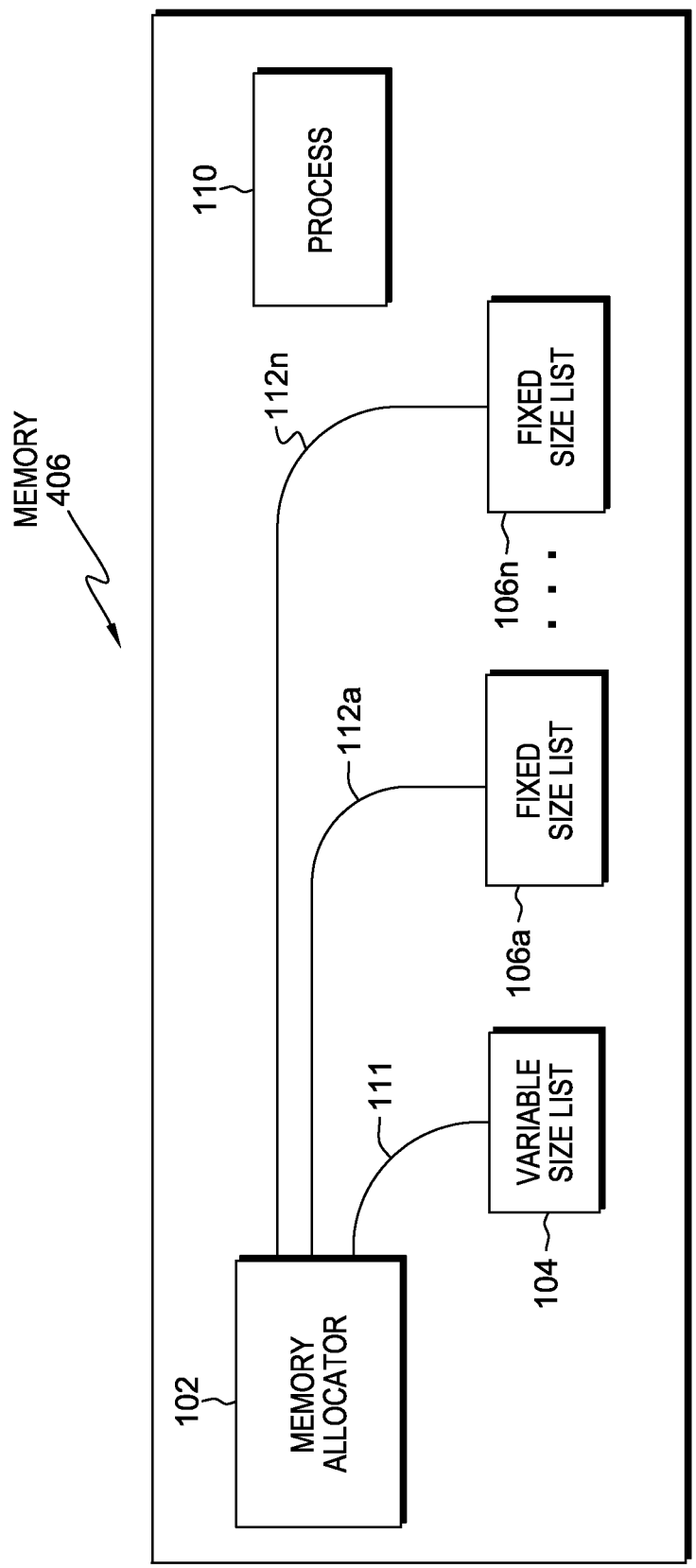
FIG. 1A is a block diagram illustrating a memory, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the Figures. FIG. 1A is a block diagram illustrating memory 406, in accordance with one embodiment of the present invention. Memory 406 is included in computer 401 and will be discussed further in reference to FIG. 4. In an embodiment, memory 406 has a unit of address resolution that is byte addressable. In another embodiment, memory 406 has a unit of address resolution that is word addressable. Memory 406 stores variable size list 104 and fixed size lists 106a through 106n. Variable size list 104 is a double linked free list of variable size memory blocks (hereinafter "blocks"). Fixed size lists 106a through 106n are also double linked free lists of blocks, wherein there is a fixed increment between block sizes, for example, 32 bytes. Although only two of fixed size lists 106a through 106n are depicted in FIG. 1A, it should be understood that there can be any number n of fixed size lists 106a through 106n (e.g., three, four, etc.).

Figure 1B:
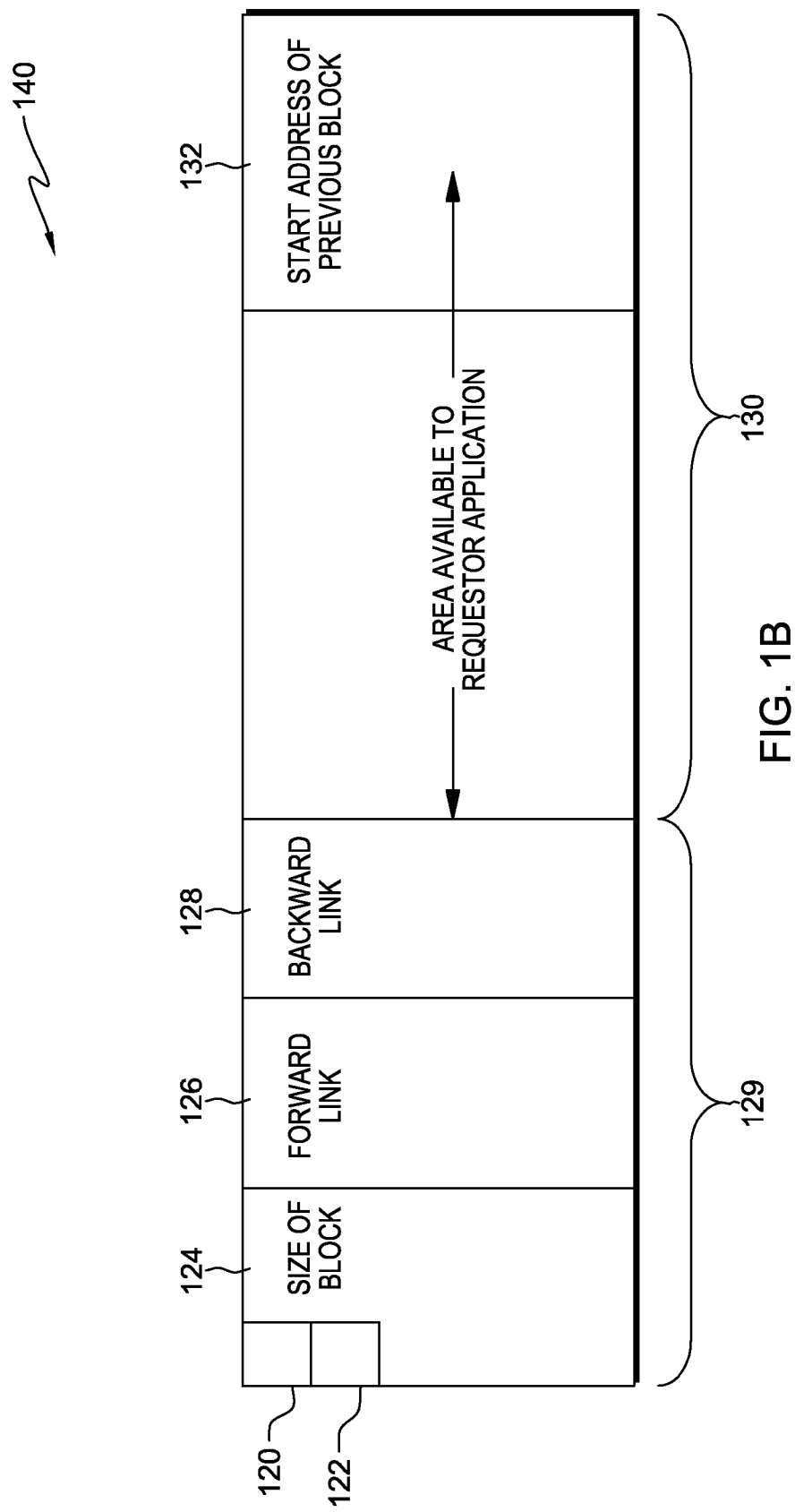
FIG. 1B is an illustration of a block included in a memory of FIG. 1A, in accordance with an embodiment of the present invention.

The structure of the blocks included in lists 104, and 106a through 106n is discussed in reference to FIG. 1B. A free list is a data structure used in a scheme for dynamic memory allocation and operates by connecting unallocated and discontinuous blocks of memory together in a linked list, using information included in the block's header as a pointer to the next. Each block included in a linked list is referred to as a node.

As also shown in FIG. 1A, memory 406 also stores process 110 and memory allocator 102, in accordance with an embodiment of the present invention. Process 110 represents an instance of a computer program that executes on computer 401. Process 110 transmits memory requests to memory allocator 102. For example, a memory request transmitted by process 110 can include a request to allocate or deallocate a particular block of memory to or from process 110, respectively. Memory allocator 102 services allocation and deallocation requests, which are both types of memory requests, transmitted by process 110 by using blocks included in memory 406.

Memory allocator 102 is included in memory 406. Memory allocator 102 is a resource manager that manages memory utilization, in accordance with an embodiment of the present invention. Memory allocator 102 includes pointers 111, and 112a through 112n, which are data types that represent a reference to a block included in variable size list 104, or one of fixed size lists 106a through fixed size list 106n, respectively. Memory allocator 102 manages one or more blocks included in memory 406. Memory allocator 102 services allocation and deallocation requests received from process 110.

FIG. 1B is an illustration of block 140 included in memory 406 of FIG. 1A, in accordance with an embodiment of the present invention. In particular, FIG. 1B is a two-dimensional depiction of the structure of each block included in variable size list 104 and fixed size lists 106a through 106n. Block 140 includes body 130 and header 129. Body 130 represents the bytes of block 140 available to a requestor application, for example, process 110, for data storage. In an embodiment, body 130 includes field 132, which corresponds to the bytes of the block used, for example, by allocator 102, to store the start address of the block that precedes the current one (e.g., that precedes block 140) in memory address order. A memory address is a data concept used by computing software and hardware to access a computing device's primary storage memory. A memory address can refer to either a block's physical address or logical address.

Header 129 represents the bytes of block 140 utilized by memory allocator 102 to store administrative information related to block 140, in accordance with an embodiment of the present invention. Header 129 includes fields 124, 126, and 128. In an embodiment, administrative information includes information stored in field 124 to reflect the memory size of block 140, for example, the byte size. In an embodiment, the lowest bit in field 124 is zero.

In another embodiment, memory allocator 102 can set the lowest bit included in field 124, for example, bit 120, to facilitate a subsequent determination as to whether block 140 is in use or not. Memory allocator 102 uses bit 120 to store administrative information used by memory allocator 102 to determine whether block 140 is in use by process 110 or on a linked list included in memory 406, such as variable size list 104 or fixed size lists 106a through 106n. Hence, if the value of the lowest bit in field 124 of block 140, bit 120, is zero (0), then block 140 is in use. Likewise, if the value of the lowest bit in field 124 of block 140, bit 120, is one (1), then block 140 is not in use.

In an embodiment, field 124 also includes bit 122, which is utilized by memory allocator 102 to store additional administrative information, for example, information that reflects whether the end of block 140, field 132, includes the address of the block that precedes block 140 in memory address order. In certain embodiments, field 132 contains an address. In other embodiments, field 132 does not contain an address. Field 126 includes a link list pointer that contains the address of the next block in the linked list. In the same vein, field 128 includes a link list pointer that contains the address of the previous block in the linked list.

Figure 2A:
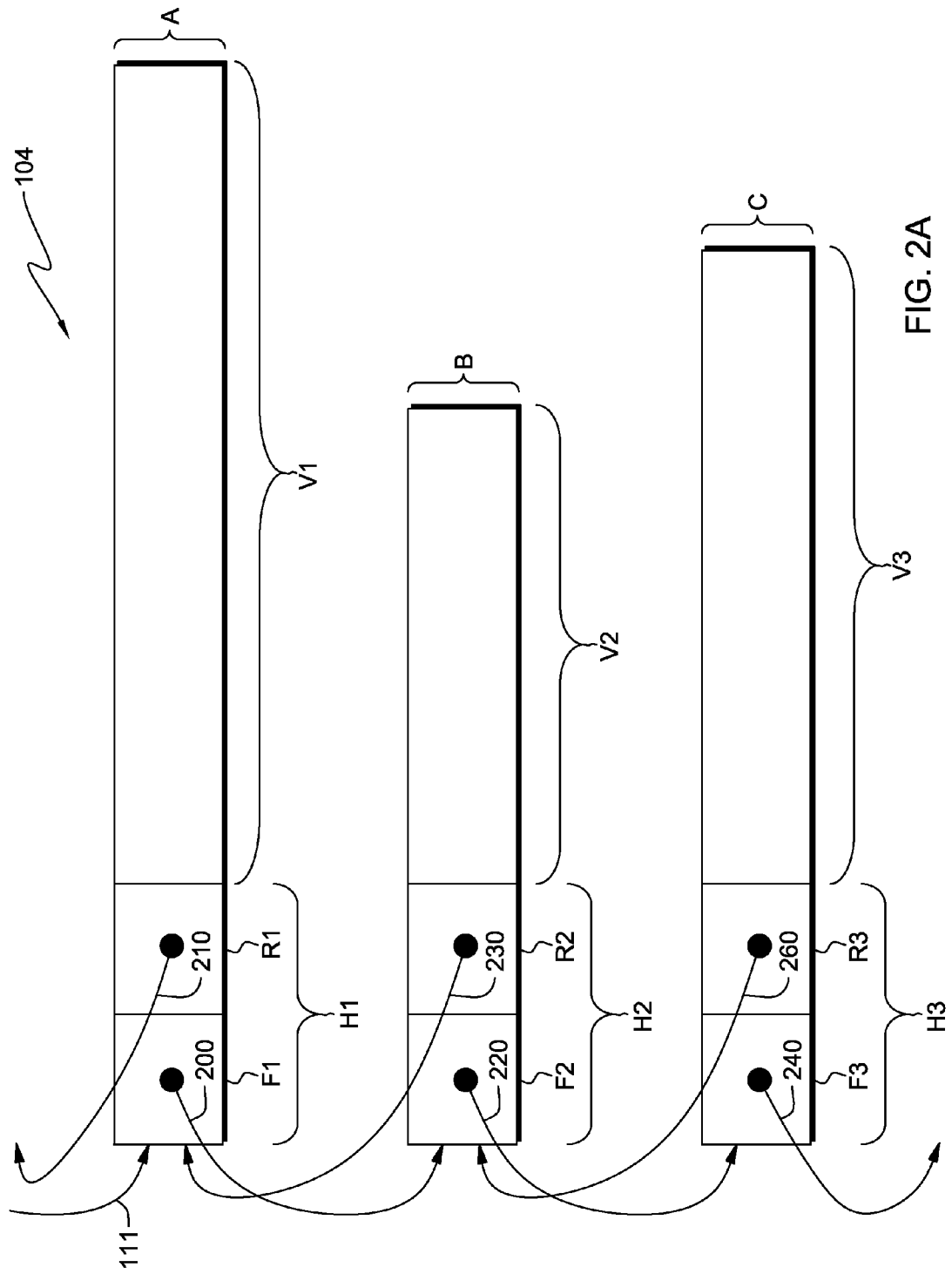
FIG. 2A illustrates a portion of a variable size list included in a memory of FIG. 1A, in accordance with an embodiment of the present invention.
Figure 2B:
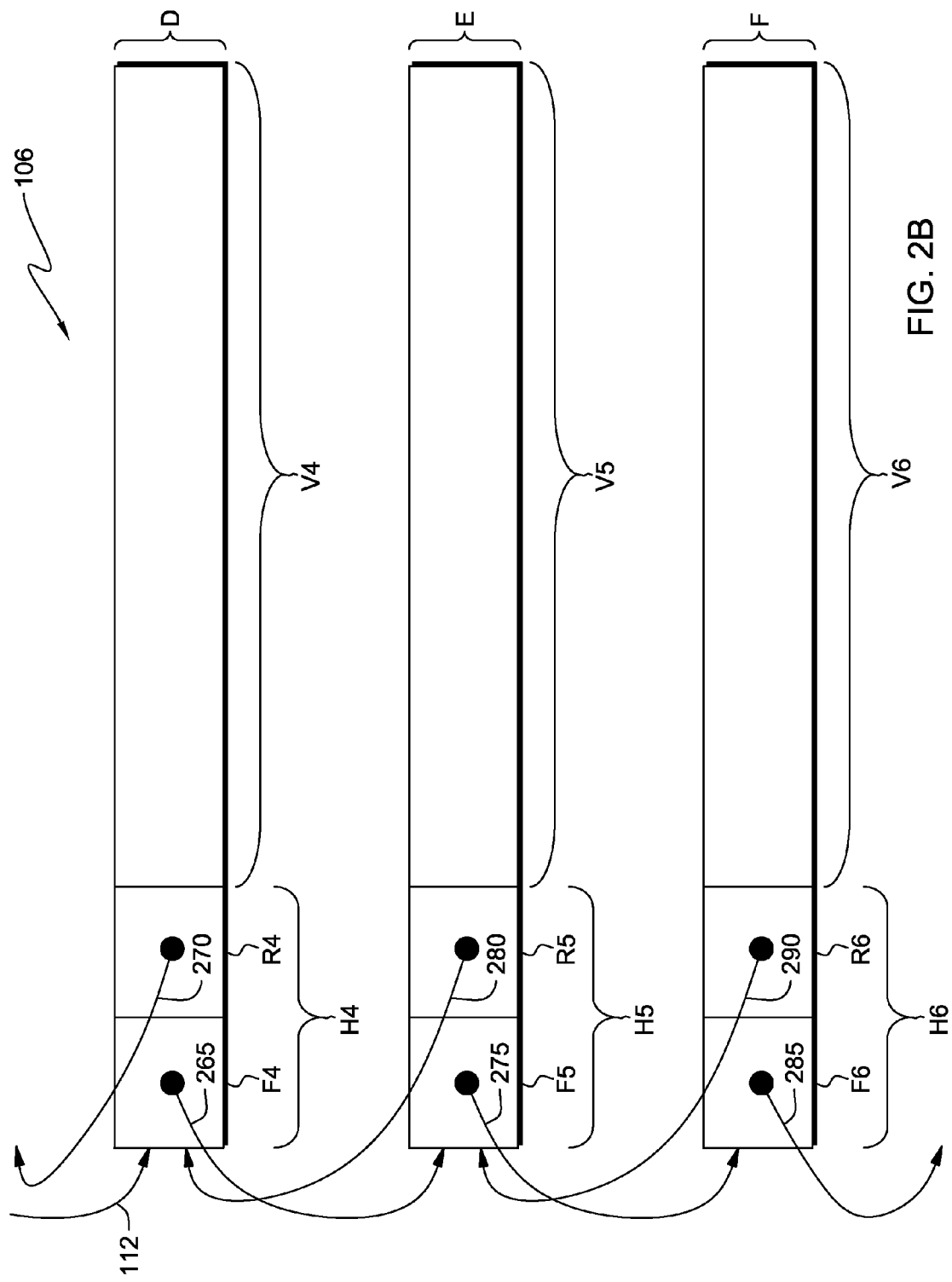
FIG. 2B illustrates a portion of a fixed size list included in a memory of FIG. 1A, in accordance with an embodiment of the present invention.

FIGS. 2A and 2B illustrate exemplary block diagrams of a variable size list and fixed size list, respectively. FIG. 2A depicts a portion of variable size list 104 included in memory 406 of FIG. 1A, in accordance with an embodiment of the present invention. In particular, FIG. 2A illustrates a portion of variable size list 104 that can be utilized by memory allocator 102 to service memory requests generated by process 110. Note that for illustrative purposes field 124 of each node is not depicted.

The portion of variable size list 104 depicted in FIG. 2A includes nodes A, B, and C, which include headers H1, H2, and H3, as well as value fields V1, V2, and V3, respectively. Pointer 111 of memory allocator 102 of FIG. 1A references a location in memory 406 that is the address of the first unallocated node in variable size list 104, for example, node A. Value fields V1, V2, and V3 of nodes A, B, and C, respectively, are non-uniform and each reflect a different byte size available to memory allocator 102 to store data.

Forward links F1 and F2 of nodes A and B include pointers 200 and 220 that include the address of the next node in variable size list 104, nodes B and C, respectively. Forward link F3 of header H3 includes pointer 240 that points to the address of the next node in variable size list 104 (not shown). In an embodiment, reverse link R1 includes pointer 210 that points to the address of the previous node in variable size list 104 (not shown). Reverse links R2 and R3 include pointers 230 and 260 that point to the beginning of nodes A and B addresses, respectively. In another embodiment, reverse link R1 includes a null value because it is in the block at the beginning of the list.

FIG. 2B illustrates a portion of fixed size list 106 included in memory 406 of FIG. 1A, in accordance with an embodiment of the present invention. Fixed size list 106 can represent any one of fixed size lists 106a through 106n. In particular, FIG. 2B illustrates a portion of fixed size list 106 that can be utilized by memory allocator 102 to service memory requests generated by process 110. Note that for illustrative purposes field 124 of each node is not depicted. The portion of fixed size list 106 depicted in FIG. 2B includes nodes D, E, and F, which include headers H4, H5, and H6 as well as value fields V4, V5, and V6, respectively.

Pointer 112 of memory allocator 102 of FIG. 1A is a data type that represents a reference to the first unallocated node of fixed size list 106, for example, node D. Pointer 112 can be any of pointers 112a through 112n of FIG. 1A, in accordance with an embodiment of the present invention.

Forward links F4 and F5 of nodes D and E include pointers 265 and 275, which are data types whose value references the address of a location in memory 406 that stores, for example, nodes E and F, respectively. Forward link F6 of header H6 includes pointer 285 that references the address of a location in memory 406 that stores the next node in fixed size list 106 (not shown). In an embodiment, reverse link R4 of node D includes pointer 270, which references the address of a location in memory 406 that stores the node that precedes node D included in fixed size list 106. Reverse links R5 and R6 of nodes E and F include pointers 280 and 290, which reference the addresses of a location in memory 406 that stores nodes D and E, respectively. In another embodiment, reverse link R4 includes a null value because it is in the block at the beginning of the list.

FIG. 2C illustrates an exemplary block diagram of portions of the variable size list and fixed size list of FIGS. 2A and 2B, respectively, in accordance with an embodiment of the present invention. In particular, FIG. 2C illustrates node B of variable size list 104 and nodes D and E of fixed size list 106 in region 202 of memory 406. Nodes in various free lists can intermingle in memory 406, as illustrated by the location of node B between nodes D and E. The forward and reverse links of headers H2, H4, and H5 are not shown. Nodes D and B are adjacent, while node E is not adjacent to either of nodes D or B. Field 132 of node B, including link 204 referencing the starting address of adjacent node D is shown. Field 132 can be used for the merger of nodes B and D, as discussed in detail below.

Figure 3A:
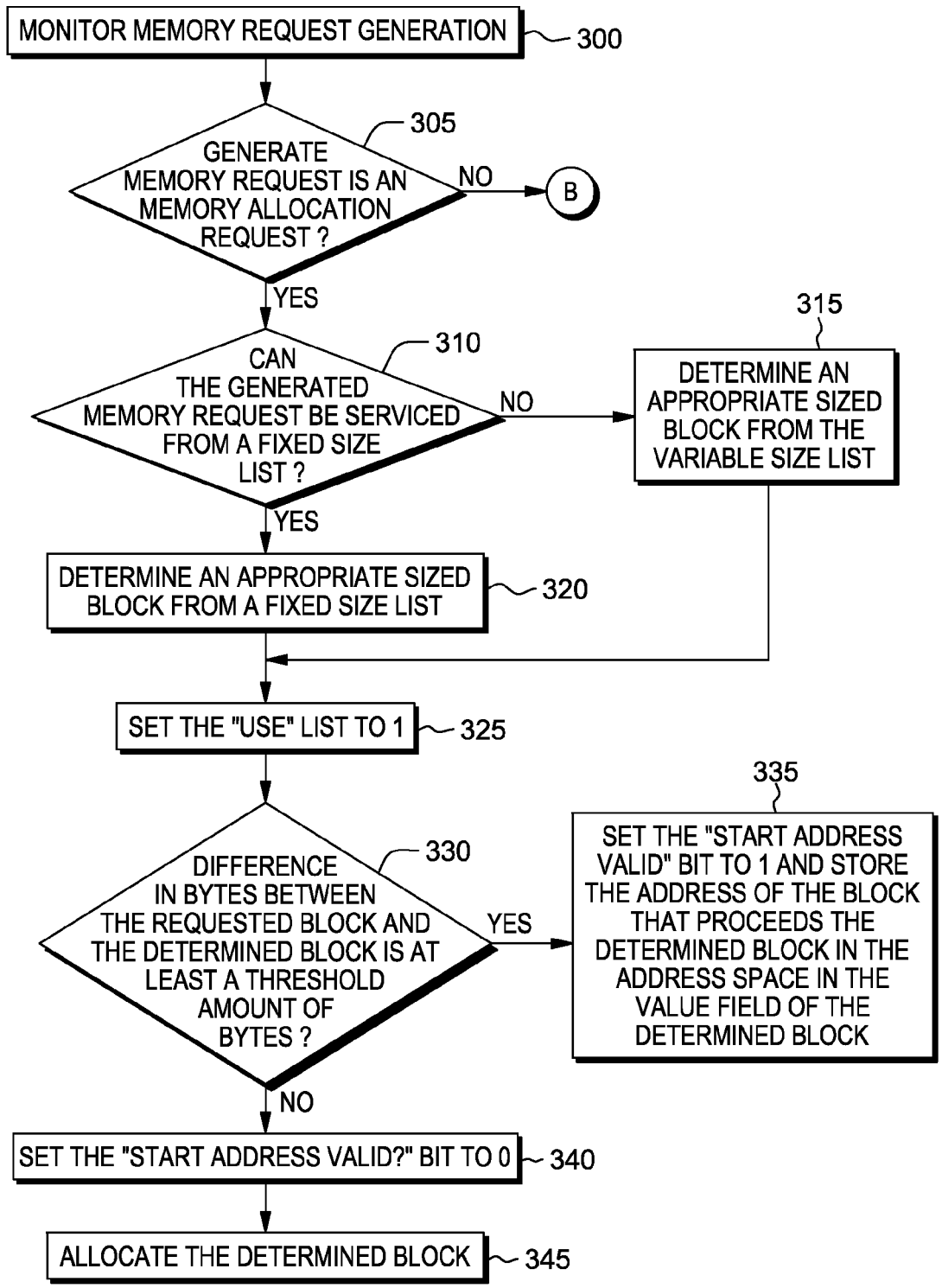
FIG. 3A is a flowchart that depicts the operational steps of a memory allocator of FIG. 1A for servicing memory requests transmitted by a process, in accordance with an embodiment of the present invention

FIG. 3A is a flowchart depicting the operational steps of memory allocator 102 of FIG. 1A for servicing memory requests transmitted by process 110, in accordance with an embodiment of the present invention. Memory allocator 102 monitors memory request generation (step 300). For example, memory allocator 102 monitors memory requests generated by process 110. In an embodiment, a memory request includes a request generated by process 110 for memory allocation or deallocation. In response to determining that the generated memory request is not an allocation request ("no" branch decisional 305), memory allocator 102 proceeds to step B of FIG. 3B.

In response to determining that the generated memory request is an allocation request ("yes" branch decisional 305), memory allocator 102 proceeds to decisional 310. If memory allocator 102 determines that the allocation request can not be serviced from a fixed size list ("no" branch decisional 310), then memory allocator 102 determines an appropriate sized block from the variable size list (step 315). For example, memory allocator 102 determines whether the allocation request can be serviced using a block included in fixed size lists 106a through 106n by comparing the size of the block requested with the size of a block included in fixed size lists 106a through 106n. Memory allocator 102 determines an appropriate size block from variable size list 104 in response to determining that the allocation request can not be serviced using fixed size list 106a through 106n.

If memory allocator 102 determines that the allocation request can be serviced from a fixed size list ("yes" branch decisional 310), then memory allocator 102 determines an appropriate sized block from a fixed size list (step 320). For example, memory allocator 102 accesses fixed size lists 106a through 106n and determines an appropriate size block by comparing the size of the requested block with the size of blocks included in fixed size lists 106a through 106n. Subsequently, memory allocator 102 sets the determined block's use bit, e.g. bit 120 of FIG. 1B, to 1 (step 325).

If memory allocator 102 determines that the difference in the number of bytes between the requested block and the determined block is at least a threshold amount of bytes ("yes" branch decisional 330), then memory allocator 102 stores the address of the block that precedes the determined block in the address space in the value field (e.g., field 132) of the determined block and sets the address valid bit, e.g. bit 122 of FIG. 1B, to 1 (step 335). For example, if a processor included in processors 404 of FIG. 4 is a m-bit processor, then memory allocator 102 requires a threshold amount of m/8 bytes of a value field to store a memory address. In an embodiment, memory allocator 102 further stores the address of the block that precedes the determined block in the address space in field 132 of the successor block that remains in variable size list 104.

If memory allocator 102 determines that the difference in the number of bytes between the requested block and the determined block is not at least a threshold amount of bytes ("no" branch decisional 330), then memory allocator 102 sets the address valid bit of the determined block to 0 (step 340). For example, if the sizes of the determined and requested blocks are 64 bytes and 62 bytes, respectfully, and memory allocator 102 requires 8 bytes (threshold amount) to store an address in a value field of a block, then the number of bytes available in the value field of the determined block to store an address, 2 bytes, is less than the threshold amount. Subsequently, memory allocator 102 allocates the determined block to the requestor (step 345). For example, memory allocator 102 allocates the determined block to process 110.

Figure 3B:
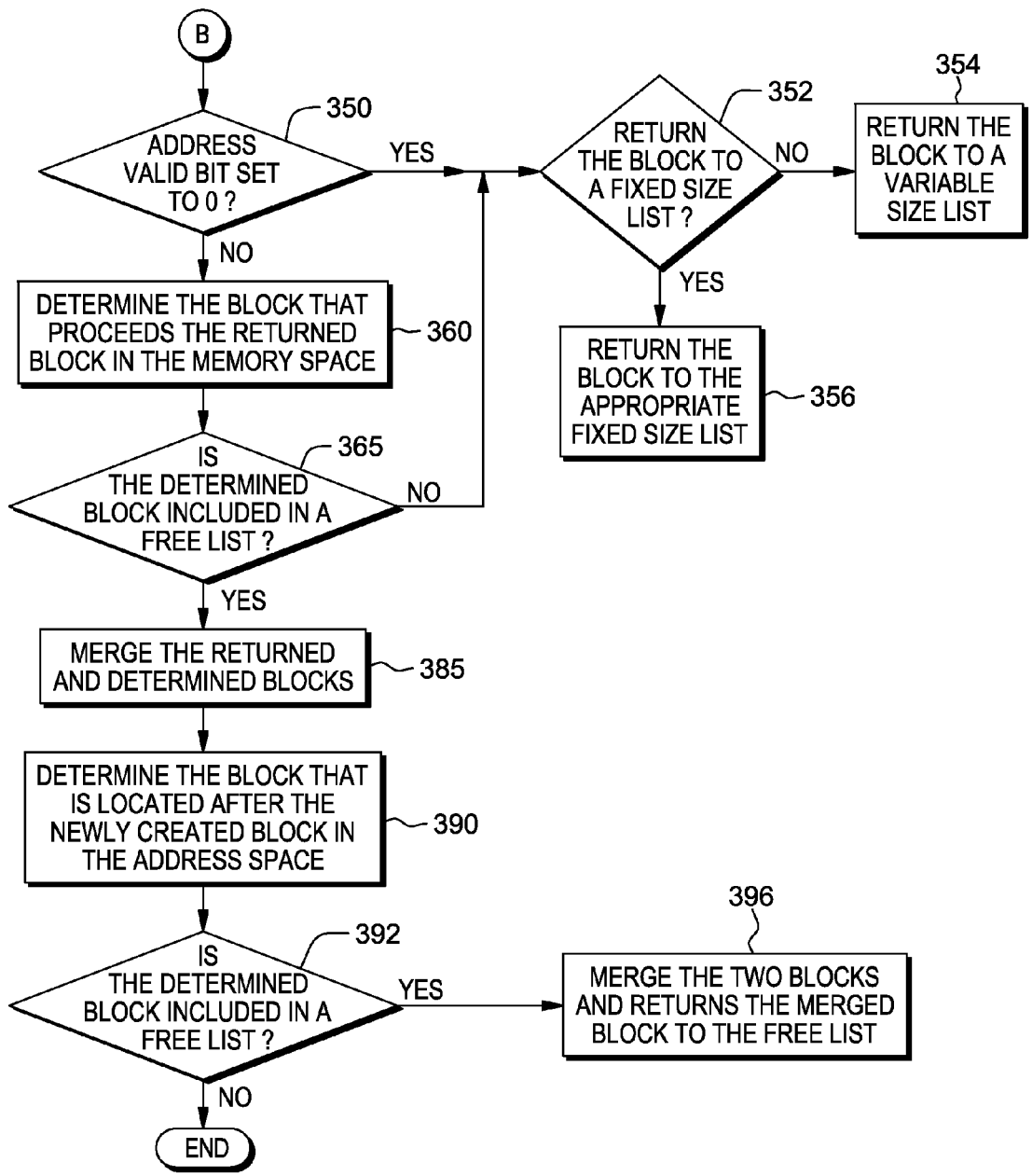
FIG. 3B is a flowchart that depicts part B of the flowchart of FIG. 3A, in accordance with an embodiment of the present invention.

FIG. 3B is a flowchart that depicts part B of the flowchart of FIG. 3A, in accordance with an embodiment of the present invention. Memory allocator 102 executes part B ("no" branch decisional 310) in response to determining that the memory request generated by process 110 is not an allocation request. As such, the memory request is a deallocation request. If memory allocator 102 determines that the address valid bit, e.g. bit 122, of the block included in the deallocation request is "0" ("no" branch of decisional 350), then memory allocator 102 determines whether the block can go into a fixed size list (decisional 352). If memory allocator 102 determines that the block can not go into a fixed size list ("no" branch decisional 352), then memory allocator 102 returns the block to the variable size list (step 354). For example, to determine whether a block should be stored in a fixed size list, memory allocator 102 determines whether the size of the block corresponds in size to a block included in one of the fixed size lists, or corresponds in size to a designated size of one of the fixed size lists. If memory allocator 102 determines that the block should be returned to a fixed size list ("yes" branch decisional 352), then memory allocator 102 returns the block the appropriate fixed size list (step 356).

If memory allocator 102 determines that the "Start Address Valid?" bit of the block included in the deallocation request is not set to "0" ("no" branch of decisional 350), then memory allocator 102 determines the block that precedes the returned block (step 360). If memory allocator 102 determines that the determined block is not included on a free list ("no" branch decisional 365), then memory allocator 102 proceeds to decisional 352. If memory allocator 102 determines that the determined block is included in a free list ("yes" branch decisional 365), then memory allocator 102 merges the returned and determined blocks (step 385). Memory allocator 102 determines the block that is located after the newly created block in the address space (step 390). If memory allocator 102 determines that the determined block is not included in the free list ("no" branch decisional 392), then memory allocator 102 stops. If memory allocator 102 determines that the determined block is on the free list ("yes" branch decisional 392), then memory allocator 102 merges the blocks together and returns the merged block to the free list (step 396).

FIG. 4 depicts a block diagram of a computer system, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes computer 401, which is may be a laptop computer, tablet computer, netbook computer, personal computer (PC), a desktop computer, a personal digital assistant (PDA), a smart phone, or any programmable electronic device, in accordance with an embodiment of the present invention. Computer 401 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Memory allocator 102 may be downloaded to persistent storage 408 through communications unit 410.

I/O interface(s) 412 allows for input and output of data with other devices that may be connected to computer 401. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, memory allocator 102, can be stored on such portable computer-readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, the method comprising:
   receiving, via a computing device, a memory request associated with a memory block, wherein the computing device has a double linked list of fixed sized memory blocks and a double linked list of variable sized memory blocks; and wherein each memory block included in the double linked list of fixed sized memory blocks and a double linked list of variable sized memory blocks includes a value field and a header field; wherein the header fields includes one or more of a backward link, forward link, and memory block size indicator; and wherein the memory block size indicator includes a first bit that reflects whether the value field includes a start address of another memory block that precedes the memory block in memory address and a second bit that reflects whether the memory block is in use by a process associated with the computing device;
   determining a scope of the received memory request, wherein the scope of the received memory request is a request for memory allocation or memory deallocation; and
   servicing, in response to the determining the scope of the received memory request, the received memory request.

2. The method of claim 1, wherein servicing the received memory request includes setting the second bit to reflect that the memory block is in use, in response to determining that the scope of the received memory request is a request for memory allocation.

3. The method of claim 1, wherein servicing the received memory request includes setting the first bit to reflect whether the address of the other memory block that precedes the memory block in memory is included in value field, in response to determining that the scope of the received memory request is a request for memory allocation.

4. The method of claim 1, wherein servicing the received memory request includes determining whether a size of the received memory request is at least a threshold size compared to a predetermined memory block that satisfies the received memory request.

5. The method of claim 1, wherein servicing the received memory request includes returning the memory block to the linked list of fixed sized memory blocks, in response to determining that the first bit reflects that the address of the other memory block that precedes the memory block in memory is included in value field and determining that the scope of the received memory request is a request for memory deallocation.

6. The method of claim 1, wherein servicing the received memory request includes merging the memory block with the other memory block, in response to determining that the first bit reflects that the address of the other memory block that precedes the memory block in memory is included in the value field and determining that the scope of the received memory request is a request for memory deallocation.

7. A computer program product, the computer program product comprising:
   one or more computer-readable storage media and program instructions stored on the one or more computer-readable storage media, the program instructions comprising:
   program instructions to receive a memory request associated with a memory block, wherein a computing device configured to execute the computer program product has a double linked list of fixed sized memory blocks and a double linked list of variable sized memory blocks; and wherein each memory block included in the double linked list of fixed sized memory blocks and a double linked list of variable sized memory blocks includes a value field and a header field; wherein the header fields includes one or more of a backward link, forward link, and memory block size indicator; and wherein the memory block size indicator includes a first bit that reflects whether the value field includes a start address of another memory block that precedes the memory block in memory address and a second bit that reflects whether the memory block is in use by a process associated with the computing device;
   program instructions to determine a scope of the received memory request, wherein the scope of the received memory request is a request for memory allocation or memory deallocation; and
   program instructions to service, in response to the program instructions to determine the scope of the received memory request, the received memory request.

8. The computer program product of claim 7, wherein the program instructions to service the received memory request includes program instructions to set the second bit to reflect that the memory block is in use, in response to the program instructions to determine that the scope of the received memory request is a request for memory allocation.

9. The computer program product of claim 7, wherein the program instructions to service the received memory request includes program instructions to set the first bit to reflect whether the address of the other memory block that precedes the memory block in memory is included in value field, in response to the program instructions to determine that the scope of the received memory request is a request for memory allocation.

10. The computer program product of claim 7, wherein the program instructions to service the received memory request includes program instructions to determine whether a size of the received memory request is at least a threshold size compared to a predetermined memory block that satisfies the received memory request.

11. The computer program product of claim 7, wherein the program instructions to service the received memory request includes program instructions to return the memory block to the linked list of fixed sized memory blocks, in response to program instructions to determine that the first bit reflects that the address of the other memory block that precedes the memory block in memory is included in value field and program instructions to determine that the scope of the received memory request is a request for memory deallocation.

12. The computer program product of claim 7, wherein the program instructions to service the received memory request includes program instructions to merge the memory block with the other memory block, in response to the program instructions to determine that the first bit reflects that the address of the other memory block that precedes the memory block in memory is included in the value field and the program instructions to determine that the scope of the received memory request is a request for memory deallocation.

13. A computer system, the computer system comprising:
one or more computer processors;
one or more computer-readable storage media;
program instructions stored on the computer-readable storage media for execution by at least one of the one or more processors, the program instructions comprising:
program instructions to receive a memory request associated with a memory block, wherein a computing device configured to execute the computer program product has a double linked list of fixed sized memory blocks and a double linked list of variable sized memory blocks; and wherein each memory block included in the double linked list of fixed sized memory blocks and a double linked list of variable sized memory blocks includes a value field and a header field; wherein the header fields includes one or more of a backward link, forward link, and memory block size indicator; and wherein the memory block size indicator includes a first bit that reflects whether the value field includes a start address of another memory block that precedes the memory block in memory address and a second bit that reflects whether the memory block is in use by a process associated with the computing device;
program instructions to determine a scope of the received memory request, wherein the scope of the received memory request is a request for memory allocation or memory deallocation; and
program instructions to service, in response to the program instructions to determine the scope of the received memory request, the received memory request.

14. The computer system of claim 13, wherein the program instructions to service the received memory request includes program instructions to set the second bit to reflect that the memory block is in use, in response to the program instructions to determine that the scope of the received memory request is a request for memory allocation.

15. The computer system of claim 13, wherein the program instructions to service the received memory request includes program instructions to set the first bit to reflect whether the address of the other memory block that precedes the memory block in memory is included in value field, in response to the program instructions to determine that the scope of the received memory request is a request for memory allocation.

16. The computer system of claim 13, wherein the program instructions to service the received memory request includes program instructions to determine whether a size of the received memory request is at least a threshold size compared to a predetermined memory block that satisfies the received memory request.

17. The computer system of claim 13, wherein the program instructions to service the received memory request includes program instructions to return the memory block to the linked list of fixed sized memory blocks, in response to program instructions to determine that the first bit reflects that the address of the other memory block that precedes the memory block in memory is included in value field and program instructions to determine that the scope of the received memory request is a request for memory deallocation.

18. The computer system of claim 13, wherein the program instructions to service the received memory request includes program instructions to merge the memory block with the other memory block, in response to the program instructions to determine that the first bit reflects that the address of the other memory block that precedes the memory block in memory is included in the value field and the program instructions to determine that the scope of the received memory request is a request for memory deallocation.

* * * * *